No. 662,478. Patented Nov. 27, 1900.
G. W. WEAVER.
CARD BOX.
(Application filed May 15, 1899.)
(No Model.) 2 Sheets—Sheet 1.
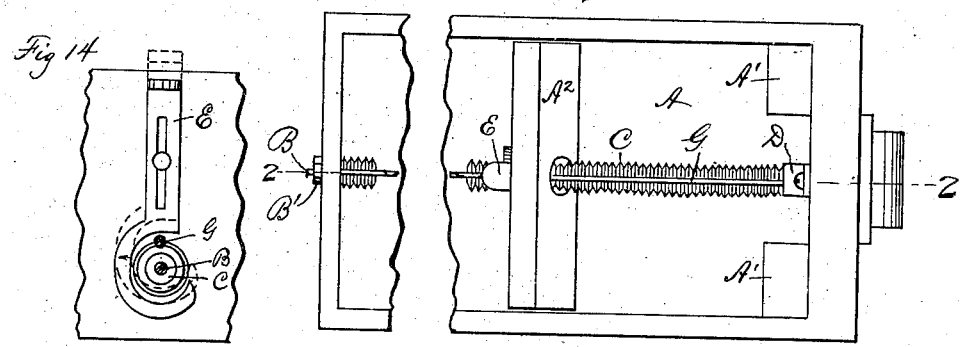
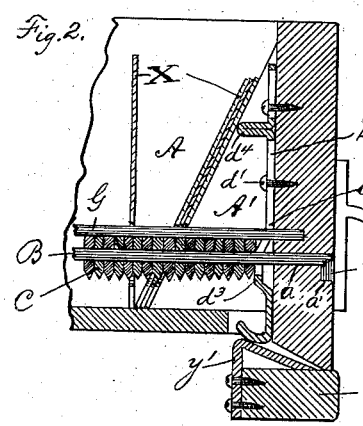
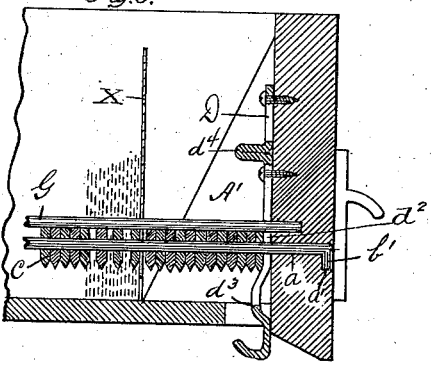
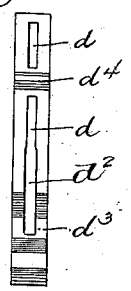
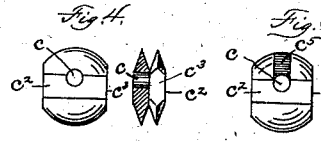
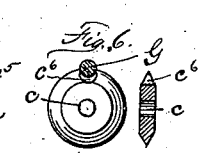
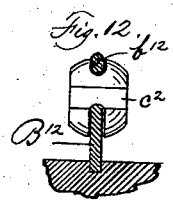
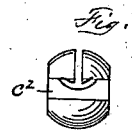
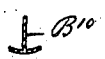
Witnesses:
C. M. Perkins.
F. Bissell.
Inventor:
George W. Weaver
by Osgood & Davis
his Attorneys No. 662,478. Patented Nov. 27, 1900.
G. W. WEAVER.
CARD BOX.
(Application filed May 15, 1899.)
(No Model.) 2 Sheets—Sheet 2.
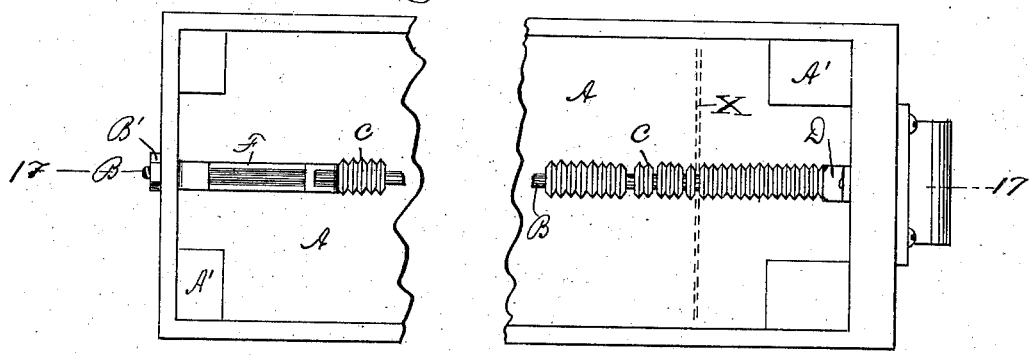
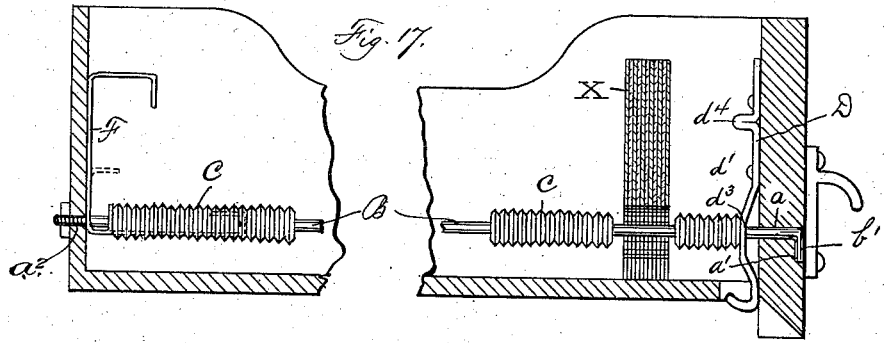
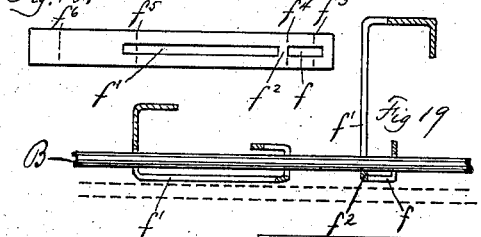
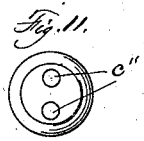
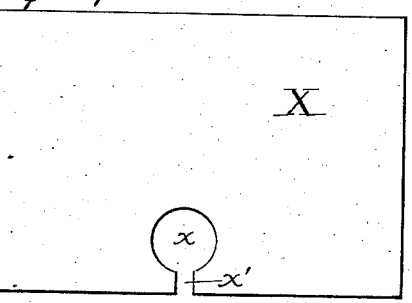
Witnesses.
C. M. Perkins
F. Bissell
Inventor.
George W. Weaver
by
Osgood & Davis
his Attorneys
THE NORRIS PETERS CO., PHOTO-LITHO., WASHINGTON, D. C.

UNITED STATES PATENT OFFICE.

GEORGE W. WEAVER, OF ROCHESTER, NEW YORK.

CARD-BOX.

SPECIFICATION forming part of Letters Patent No. 662,478, dated November 27, 1900.

Application filed May 15, 1899. Serial No. 716,957. (No model.)

*To all whom it may concern:*

Be it known that I, GEORGE W. WEAVER, a citizen of the United States, and a resident of Rochester, in the county of Monroe and State of New York, have invented certain new and useful Improvements in Card-Boxes, of which the following is a specification.

This invention relates to card-boxes. Its object is to provide means whereby cards may be held in a suitable casing in such a manner that the separate cards may be easily moved for examination or may be removed from the casing or inserted therein with ease.

My invention consists of the devices and arrangements of parts hereinafter described and claimed.

In the drawings, Figure 1 is a top plan view of a card-box embodying my invention. Fig. 2 is a partial central section on the line 2 2 of Fig. 1. Fig. 3 is a similar section showing the parts in different positions from those shown in Fig. 2. Figs. 4, 5, 6, 7, 8, 9, 10, and 11 show different modifications of movable card-retaining devices embodying my invention. Figs. 12 and 13 show other modified forms of my invention. Fig. 14 shows a front elevation of a locking device upon a sliding block. Fig. 15 shows a front elevation of the compressing device shown in Figs. 1, 2, and 3. Fig. 16 is a top plan view of a card-box embodying my invention having two compressing devices. Fig. 17 is a vertical longitudinal section on the line 17 17 of Fig. 16. Fig. 18 is a top plan view of the second compressing device shown in Figs. 16 and 17 before the same is bent into its proper form. Fig. 19 shows said compressing device in two different positions, and Fig. 20 is a view of a card such as is employed in my device.

In the drawings, A is the casing or drawer, which is of any suitable form or dimensions to contain a series of suitable cards X. Each card has a perforation $x$ near its edge and a slot $x'$ extending from said perforation to the edge of the card, which slot is narrower than the width or diameter of the perforation. From end to end in the drawer A is a wire or rod B, that is preferably, for simplicity of construction and ease in use, placed in the middle line of the drawer and near the bottom thereof. This rod is fastened to the front end of the drawer—for instance, as shown in Figs. 2 and 3—by being inserted through a perforation $a$ in the drawer end and has a downturned end $b'$ that rests in a socket $a'$ in the outer side of the drawer-front. The rod B may therefore be inserted through the perforation $a$ and through a similar perforation $a^2$ in the back end of the drawer, as shown in Fig. 17. The rear end of the rod B may be threaded, and a nut B' thereon on the outside of the drawer-casing serves to hold the rod in place and to take up its slackness if it should stretch. By these arrangements a rod of small diameter may be employed. In the present embodiment of my invention the rod B is the supporting apparatus for a series of card-retainers that may be a series of beads or disks C strung upon the rod. The form shown in Figs. 1, 2, 3, 16, and 17 is the simplest form of the disk-retainer herein shown and is shown in Fig. 6 in elevation and in section. It is a disk C, beveled at the edge from both sides and having a perforation $c$ in its center through which the rod B is passed. The number of disks on the rod is not great enough to occupy all the space between the inner faces of the front and rear ends of the drawer; but a certain amount of space, as desired, upon the rod is left unoccupied by disks, as shown, for instance, in Fig. 3, and a clamping or compressing device is provided, operated either by hand or automatically, whereby the disks may be pressed tightly against each other and the whole series of retainers may be held in a fixed position. If the compressing or holding device is disengaged from action upon the beads, the beads may be separated, and it will be obvious that a card, such as shown in Fig. 20, may be slipped between any two contiguous beads, so that the rod B will pass through the slot $x'$ and into the center of the perforation $x$. If the beads are somewhat smaller than the perforation $x$, the card may be moved backward and forward freely, provided it is so guided by the bottom and sides of the drawer A that the perforation $x$ registers properly with the position of the series of beads. It will also be clear that a card may be inserted at any point in the drawer, because if the beads are free to move slightly the card may pass between the beveled edges of adjacent beads and will force the beads apart, and thus the card may be pushed down into place in the drawer. The beads should, of course, be wider than the slot and the rod B or the supporting apparatus should be narrower than the slot.

In Figs. 2, 3, and 15 I show one form of compressing device for the beads, a wedging mechanism, whereby the cards are locked in the drawer when said compressing device is in operation. On the inner side of the front of the drawer I arrange a vertical bar D, having slots $d$, through which screws $d'$ may pass in order to fasten it to the inner face of the drawer-front, and slot $d^2$, through which the rod B passes. The bar D may therefore be moved in a proper line (vertical in the drawings) against the face of the drawer-front. The bar D is bent outward, as at $d^3$, to form a projection from the surface of the bar and in such a position that when the bar D is pulled upward into the position shown in Fig. 2 the projecting portion $d^3$, coming in contact with the adjacent disk of the series on the rod B, forces all the disks of the series tightly together, and thus holding all the card-retainers in a fixed position, so that the cards cannot be removed from the drawer; but when the bar is pushed downward into the position shown in Fig. 3 the projecting portion $d^3$ is removed from engagement with the disks C and they may be moved upon the rod B, releasing the card-retainers and permitting the removal of cards. In order that the disks shall be forced together automatically whenever the drawer C is closed, I provide upon the rail Y of the drawer-container an angular guide $y'$, which when the drawer is pushed fully in, as shown in Fig. 2, comes in contact with the lower end of the bar D and forces it upward, locking the disks in their card-retaining position, so that if the drawer is pulled out after this action has taken place and should be turned over or dropped the cards cannot fall out. I thus provide an automatic locking device for the card-retainers. The lower end of the rod B may be bent upward, if desired, into the form shown in Figs. 2 and 3 and may have a handle, as $d^4$, for moving it in order to release the disks from compression. At the front end of the drawer there may be angular blocks A' to support the cards in a tilted position, and as usual in devices of this character a sliding block $A^2$ is employed having a slot or perforation, for instance, corresponding in shape and position to the slot $x'$ and the perforation $x$ of a card. This block may be moved longitudinally in the drawer in order to limit the movements of cards held therein in a manner well known. The block is held in place in the drawer by means of a sliding bar E, fixed upon the rear face of the block and adapted to slide up and down. Said bar has an opening whereby the bar may be moved to straddle or embrace the rod B between any two adjacent disks C, as shown in Fig. 14. When the rod engages between two disks, it holds the block $A^2$ in place. It is quite obvious that a suitable locking device may be employed for the bar E to prevent its movement. An additional rod G is employed, if desired, having its ends set in the ends of the casing, and the disk C has a notch in its upper edge in which the rod G rests, so that the cards may rest on the rod, and the disks are prevented from turning on the rod B and impairing the registry of the faces $c^2$.

A modified form of holding or compressing device is shown in Figs. 16 and 17 and which may be used either alone or in addition to the bar D mentioned above. If used in addition to said bar D, it is employed at the opposite end of the series of disks in order to obtain a greater range of movement of the disks when freed from its action, as shown in Fig. 17, and to permit a considerable number of cards to be removed from or to be inserted into the drawer at once. This device is a flat bar F, (shown in Fig. 18,) having a short slot $f$ near one end and a long slot $f'$ along its middle. The two slots are separated by a narrow neck $f^2$. The bar is then bent at right angles on each of the transverse lines $f^3$ $f^4$ $f^5$, and, if desired, also on the line $f^6$. It will be seen that the lines $f^3$ and $f^5$ cross the slots $f$ and $f'$, respectively. The bar then has the form shown in side view in Figs. 17, 18, and 19. The rod B passes through the slots $f$ and $f'$, and the bar F may be tilted into the two positions shown in Fig. 19 without being disengaged from the bar B. When the bar is tilted into the position shown on the right in Figs. 19 and 17, the card-retainers are loose on the rod B; but when the bar F is tilted into the position shown on the left in Fig. 19 the length of the rod B available for movement of the disks thereon is much reduced.

Numerous modifications may be made in the forms of the card-retainers and of the supporting apparatus, and some of these modifications will now be described.

It is quite clear that the beads or disks may have different forms. The circular form (shown in Fig. 6) is desirable in many instances.

In Fig. 4 a disk is shown having beveled edges at the top and bottom and having a transverse portion $c^2$ running across the side or face of the disk, with the faces of said portion parallel. Of course in the use of this form of the device the perforation corresponding to the perforation $x$ in the card is made to correspond, if desired, in contour to that of the disk. The transverse band $c^2$, with its parallel edges, permits easy insertion of the cards and also prevents lateral movements thereof and forms, when the disks are set in the series, a flat continuous edge $c^3$, because the flat faces $c^2$ set closely against each other. Hence the cards in the drawer (if the width of the drawer is substantially that of the cards or enough wider to permit free movement) can be more easily moved backward and forward in the drawer than when using the form of disk shown in Fig. 6, which produces a kind of serrated edge when the series of disks are held together to form a rod.

In Fig. 5 the form of device shown in Fig. 4 is modified by the addition of a projection $c^5$, which fits against the beveled edge of the next adjacent disk and is narrower than the width of the perforation $c$ through the disk and extends vertically upward therefrom. When the card is inserted between two adjacent disks of this form, the projection $c^5$ passes through the slot $x'$ in the card and forms, as shown in Fig. 5, when the disks are compressed together, an uninterrupted edge on the top of the cards, so that the cards when tilted at the usual angle may rest thereon and may be moved backward and forward more freely and with less wear to the interior of the perforation $x$ than is the case when the disks are beveled, as shown in Fig. 6.

In Figs. 4 and 5 the perforation C is above the center of the disk in order that the disks may not tilt and impair proper registry of the flat faces $c^2$.

In Fig. 7 the same form of disk shown in Fig. 4 is employed, but with a perforation that is comparatively large and contains a large rod $B^6$, that extends slightly above the level of the top edge of the disk, and hence the cards when lying at an angle, as shown in Fig. 2, will rest upon the top of the rod $B^6$ and not upon the upper edge of the card.

In Fig. 8 the disk has a central perforation $c^8$ and a narrower slot $c^{80}$ extending therefrom to the edge of the disk. The support is a bar having a corresponding cross-section or a rod fitting in the perforation and a flat bar lying in the slot. The upper edge of the bar may extend above the upper edges of the disks for purposes above explained.

In Fig. 9 is shown the same form of disk as in Fig. 4; but the rod $B^9$ is triangular in form and projects according to the same method as described with reference to Fig. 7 above the upper edge of the disk and for the same purposes.

In Fig. 10 the rod $B^{10}$ is of T shape and the perforation through the disk is of corresponding form.

In Fig. 11 the disk may be of the form shown in Figs. 4, 5, or 6 and has two perforations $c^{11}$ in vertical alinement, and two rods $B^{11}$ of the same character as those hereinbefore described are employed as the supporting apparatus. The duplication of rods is for greater strength where large numbers of cards are to be used in the drawer.

In Fig. 12 the same disk as shown in Fig. 4 is employed; but the series is supported by a flat bar $B^{12}$, extending upward from the bottom of the drawer, and is held thereon by a rod or bar $b^{12}$, resting in a notch in the top edge of the disk. The latter rod $b^{12}$ is held and stretched substantially in the same manner as the rod B.

In Fig. 13 two guides or rods $B^{13}$ $b^{13}$ are employed as the supporting apparatus and are preferably of such form as to resist vertical bending. Between the rods is held a series of rollers $C^{13}$, each having a groove $c^{13}$ around its middle, in which both the rods $B^{13}$ $b^{13}$ are held. These rollers may be separated in the same manner as the disks C and obviously accomplish the same result in the same manner. When used with cards having a suitable perforation and a slot extending from the perforation to the edge of the card, whereby when a card is inserted the slot may pass over the rod $B^{13}$ and the rollers rest within the perforation, the rollers or card-retainers may then be pressed together exactly as are the disks C above described.

The locking device D and the supplementary device E are not essential to the operation of my invention. It will be obvious that if a proper number of card-retainers are employed the total amount of play may be only sufficient for the insertion or withdrawal of, say, one or two cards at a time—*i. e.*, the total space between the retainers is equal to the thickness of only one or two cards. Hence in case of accident or if an attempt is made to withdraw more than two cards (either contiguous or separated) at a time the cards will jam between the beveled edges of the retainers, and thus the release of any of them will be prevented. In practice this same result is obtained with from five to a dozen cards, depending upon their thickness. The ends of the box or the locking devices D and E are means for limiting the movement of said card-retainers.

What I claim is—

1. In a card-box, a casing, a series of cards each having a perforation and a slot narrower than the width of the perforation and extending therefrom to the edge of the card, a series of independently-movable card-retainers each wider than the said slot but smaller than said perforation, supporting apparatus narrower than said slot for said card-retainers, and means for holding said series of retainers in a fixed position.

2. In a card-box, a casing, a series of cards each having a perforation and a slot narrower than the width of the perforation and extending therefrom to the edge of the card, a series of independently-movable card-retainers each wider than said slot but smaller than said perforation, a rod apparatus narrower than said slot for said card-retainers, and means for holding said series of retainers in a fixed position on said rod apparatus.

3. In a card-box, a casing, a series of cards each having a perforation and a slot narrower than the width of the perforation and extending therefrom to the edge of the card, a series of perforated beads, a rod passing through all the perforations for supporting said beads, said rod being of less width than said slot, and means for holding said series of beads in a fixed position on said rod.

4. In a card-box, a drawer, a series of cards each having a perforation and a slot narrower than the width of the perforation and extending therefrom to the edge of the card, a series of independently-movable card-retainers each wider than said slot but smaller than said perforation, a supporting apparatus narrower than said slot for said card-retainers, means for holding said series of retainers in a fixed position, and means for automatically operating said means for holding said card-retainers.

5. In a card-box, a casing, a series of cards each having a perforation and a slot narrower than the width of the perforation and extending therefrom to the edge of the card, a series of perforated beads, a rod passing through all the perforations for supporting said beads, said rod being of less width than said slot, means for holding said series of beads in a fixed position, and means for automatically operating said means for holding said beads.

6. In a card-box, a drawer, a series of cards each having a perforation and a slot narrower than the width of the perforation and extending therefrom to the edge of the card, a series of independently-movable card-retainers each wider than said slot but smaller than said perforation, supporting apparatus narrower than said slot for said card-retainers, means for holding said series of retainers in a fixed position, and means for automatically operating said means for holding said card-retainers.

7. In a card-box, a casing, a series of cards each having a perforation and a slot narrower than the width of the perforation and extending therefrom to the edge of the card, a series of perforated beads, each having a face extending to its edge adapted to fit closely against the side of the adjacent bead to the edge thereof, a rod passing through all the perforations for supporting said beads, said rod being of less width than said slot, and means for holding said series of beads in a fixed position on said rod.

8. In a card-box, a drawer, a series of cards each having a perforation and a slot narrower than the width of the perforation and extending therefrom to the edge of the card, a series of perforated disks, each having a face extending to its edge adapted to fit closely against the side of the adjacent retainer to the edge thereof, a rod passing through all the perforations for supporting said disks, said rod being of less width than said slot, means for holding said series of disks in a fixed position on said rod, and means for automatically operating said means for holding said card-retainers.

9. In a card-box, a casing, a series of cards each having a perforation and a slot narrower than the width of the perforation and extending therefrom to the edge of the card, a series of independently-movable card-retainers each wider than said slot but smaller than said perforation, a supporting apparatus narrower than said slot for said card-retainers, and a wedging device for compressing and holding said retainers closely together.

10. In a card-box, a casing, a series of cards each having a perforation and a slot narrower than the width of the perforation and extending therefrom to the edge of the cards, a series of independently-movable card-retainers each wider than said slot but smaller than said perforations, a rod apparatus narrower than said slot for said card-retainers, and a wedging device for compressing and holding said retainers closely together on said rod apparatus.

11. In a card-box, a casing, a series of cards each having a perforation and a slot narrower than the width of the perforation and extending therefrom to the edge of the card, a series of perforated beads, a rod passing through all the perforations for supporting said beads, said rod being of less width than said slot, and a wedging device for compressing and holding said beads closely together on said rod.

12. In a card-box, a drawer, a series of cards each having a perforation and a slot narrower than the width of the perforation and extending therefrom to the edge of the card, a series of independently-movable card-retainers each wider than said slot but smaller than said perforation, supporting apparatus narrower than said slot for said card-retainers, means for holding said series of retainers in a fixed position, means for automatically operating said means for holding said card-retainers, and a wedging device for compressing and holding said retainers closely together.

13. In a card-box, a casing, a series of cards each having a perforation and a slot narrower than the width of the perforation and extending therefrom to the edge of the card, a series of perforated beads, a rod passing through all the perforations, for supporting said beads, said rod being of less width than said slot, and a wedging device for compressing and holding said beads closely together on said rod.

14. In a card-box, a casing, a series of cards each having a perforation and a slot narrower than the width of the perforation and extending therefrom to the edge of the card, a series of independently-movable card-retainers each wider than said slot but smaller than said perforations, a supporting apparatus for said retainers narrower than said slot and a wedging device for compressing and holding said retainers closely together on said rod.

15. In a card-box, a casing, a rod held longitudinally in said casing, and a series of beads strung on said rod, and a series of slotted cards adapted to be retained in said casing by said beads and rod.

16. In a card-box, the casing, the parallel rods held in said casing and the series of beads supported by said rods, and a series of slotted cards adapted to be retained in said casing by said beads and rods.

17. In a card-box, the casing A, the rod B, held longitudinally in the casing, the series of disks C strung on said rod, and the wedging device D on the inner side of the end of the casing and adapted to compress and hold the disks closely together.

18. In a card-box, the casing A, the rod B held longitudinally in the casing, the series of disks C strung on said rod, the wedging device D on the inner side of the end of the casing and adapted to compress and hold the disks closely together, and the sliding block A² provided with means for engaging between disks of said series.

19. In a card-box, the casing A, the rod B, held longitudinally in the casing, the series of disks C strung on said rod, the wedging device D on the inner side of the casing and adapted to compress and hold the disks closely together, the sliding block A² provided with means for engaging between disks of said series, and a supplementary device for increasing the available range of movement of the disks on the rod.

20. In a card-box, a casing, a series of cards each having a perforation and a slot narrower than the width of the perforation and extending therefrom to the edge of the card, a series of beads each having a perforation intersecting the edge of the bead and another perforation, two rods passing through the perforations, for supporting and guiding the beads, said rods being each of less width than said slot, and means for holding said series of beads in a fixed position with reference to said rods.

21. In a card-box, a casing, a series of cards each having a perforation and a slot narrower than the width of the perforation and extending therefrom to the edge of the card, a series of independently-movable card-retainers each wider than said slot but smaller than said perforation, supporting apparatus narrower than said slot for said card-retainers, and means for limiting the movement of said retainers.

22. In a card-box, a casing, a series of cards each having a perforation and a slot narrower than the width of the perforation and extending therefrom to the edge of the card, a series of independently-movable card-retainers each wider than said slot but smaller than said perforation, a rod apparatus narrower than said slot for said card-retainers, and means for limiting the movement of said retainers.

23. In a card-box, a casing, a series of cards each having a perforation and a slot narrower than the width of the perforation and extending therefrom to the edge of the card, a series of perforated beads, a rod passing through all the perforations for supporting said beads, said rods being of less width than said slot, and means for limiting the movement of said beads on said rod.

24. In a card-box, a casing, a series of cards each having a perforation and a slot narrower than the width of the perforation and extending therefrom to the edge of the card, a series of perforated beads, each having a face extending to its edge adapted to fit closely against the side of the adjacent bead to the edge thereof, a rod passing through all the perforations for supporting said beads, said rod being of less width than said slot, and means for limiting the movement of said beads on said rod.

25. In a card-box, a casing, a series of cards each having a perforation and a slot narrower than the width of the perforation and extending therefrom to the edge of the card, a series of beads each having a perforation intersecting the edge of the bead and another perforation, two rods passing through the perforations, for supporting and guiding the beads, said rods being each of less width than said slot, and means for limiting the movement of said beads with reference to said rods.

26. In a card-box, a casing, a series of cards each having a perforation and a slot narrower than the width of the perforation and extending therefrom to the edge of the card, a series of perforated beads, a rod passing through all the perforations for supporting said beads, said rods being of less width than said slot, means for limiting the movement of said beads on said rod, and a supplementary device for increasing the range of movement of the beads with reference to said rod.

27. In a card-box, a casing, a series of cards each having a perforation and a slot narrower than the width of the perforation and extending therefrom to the edge of the card, a series of beads each having a perforation intersecting the edge of the bead and another perforation, two rods passing through the perforations, for supporting and guiding the beads, said rods being each of less width than said slot, means for limiting the movement of said beads with reference to said rods, and a supplementary device for increasing the range of movement of the beads with reference to said rods.

GEO. W. WEAVER.

Witnesses:
C. M. PERKINS,
F. BISSELL.